Sept. 7, 1965

W. F. ISLEY ETAL 3,204,623

FUEL VISCOSITY CONTROL DEVICE

Filed May 20, 1963

INVENTORS
WALTER F. ISLEY
FRANK C. DRUZYNSKI
BY

*Hauke & Hauke*

ATTORNEYS

Sept. 7, 1965  W. F. ISLEY ETAL  3,204,623
FUEL VISCOSITY CONTROL DEVICE
Filed May 20, 1963  2 Sheets-Sheet 2

INVENTOR.
WALTER F. ISLEY
BY FRANK C. DRUZYNSKI

ATTORNEYS

United States Patent Office 3,204,623
Patented Sept. 7, 1965

3,204,623
FUEL VISCOSITY CONTROL DEVICE
Walter F. Isley, Grosse Pointe, and Frank C. Druzynski, Bloomfield, Mich., assignors to Continental Aviation and Engineering Corporation, Detroit, Mich., a corporation of Virginia
Filed May 20, 1963, Ser. No. 281,715
6 Claims. (Cl. 123—140)

The prevent invention relates to multifuel engines and more particularly to an improved control means for automatically varying the quantity of fuel for such an engine to maintain a maximum power output for any fuel being used.

Multifuel engines are called upon to operate with fuels having a significant variation in density and heating value per gallon. When equipped with conventional type injection systems which meter essentially a constant volume for any fuel, the engine will produce a variation in maximum power directly proportional to the equivalent heating value of the volume of fuel injected.

The present invention provides a control means which automatically varies the quantity of fuel so that the maximum power output of the engine will remain constant with any fuel being used.

An examination of the viscosity characteristics of fuels at varying temperatures shows a definite relationship between viscosity and fuel heating value. This viscosity characteristic is used as the sensed variable in the control means of the present invention. The fuel is passed in series through two orifices, having widely different flow characteristics, so that with a change in viscosity, a pressure drop change takes place which in turn moves a piston to vary the full load stop on the injection pump.

Our copending application, Ser. No. 189,378 filed April 23, 1962, discloses a fuel viscosity responsive control device which is operable to automatically vary the quantity of fuel in accordance with changes in viscosity. While this device has proved satisfactory in operation the present application discloses a device in which manufacturing costs are reduced by elimination of some of the mechanism necessary in the heretofore disclosed device.

It is an object of the present invention to obtain a consistent maximum power output for multifuel engines by providing an improved fuel control means which is automatically operable to vary the volume of fuel in response to changes in its heating value per gallon.

It is another object of the present invention to provide an improved control for varying the flow of fuels to a multifuel engine which utilizes the proportional relationship between the viscosity and the heating value per gallon of the fuel being used.

It is yet another object of the present invention to reduce the costs of manufacturing fuel control systems for multifuel engines by providing a control device utilizing a minimum number of operating parts.

Still further objects and advantages will readily occur to one skilled in the art to which the invention pertains upon reference to the following drawings in which like reference characters refer to like parts throughout the several views and in which FIG. 1 is a chart showing the relationship between viscosity and heating value for several types of fuels and at different temperatures.

Figure 1:
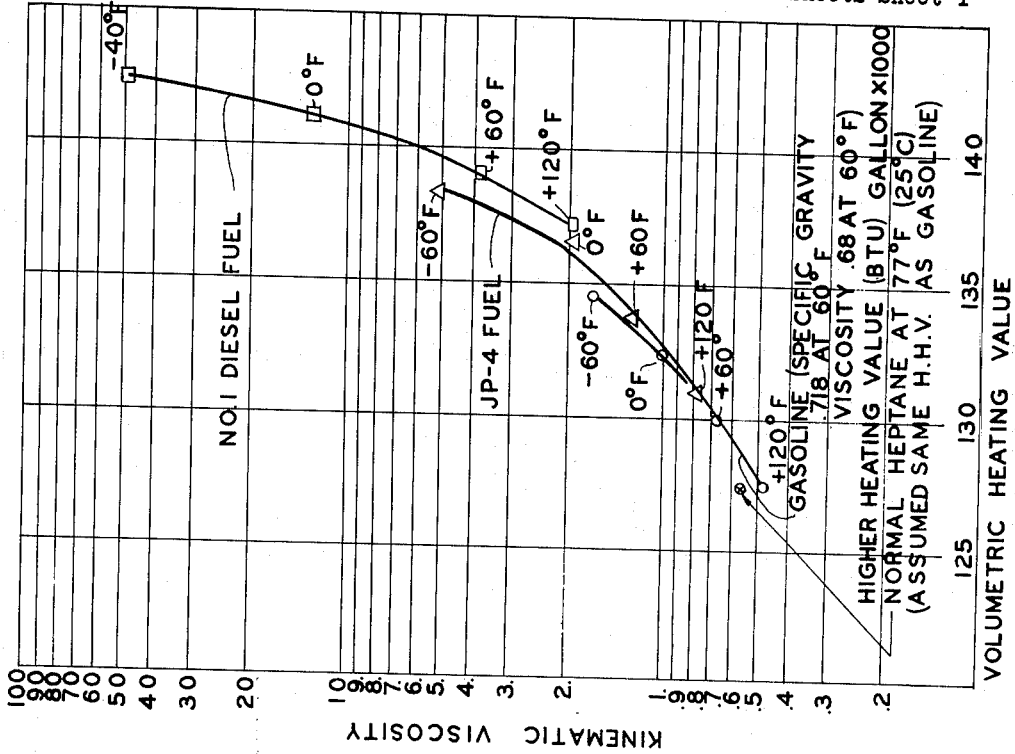

FIG. 1 illustrates the relationship between the viscosity and heating value of various fuels which is made use of in the present invention. As can be seen on this chart, the relationship is almost a straight line for the various hydrocarbon fuels that are shown. By sensing changes in viscosity in effect it is possible to also sense changes in the heating value of the fuel being used.

Figure 2:
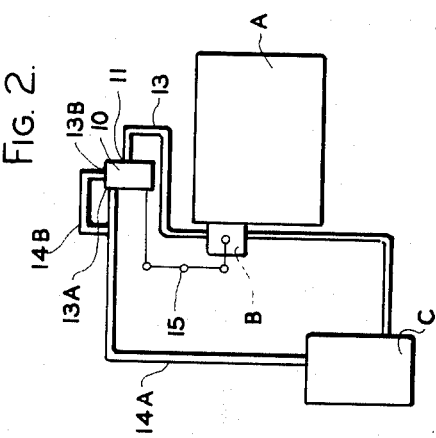
FIG. 2 is a diagrammatic view illustrating the relation of a preferred control to a multifuel engine.

FIG. 2 illustrates diagrammatically a multifuel engine A having a fuel pump B preferably drivingly connected thereto and operable to deliver fuel to the engine A from a fuel tank C. A fuel control device 10 is provided with an inlet port 11 connected to the pump B by a suitable conduit member 13. The control device 10 is provided with an outlet 13A connected to the fuel tank C by conduit 14A and an outlet 13B connected to the conduit 14A by branch conduit 14B. Suitable linkage 15 operably connects the control device 10 and the fuel pump B as will be described in greater detail below.

Figure 3:
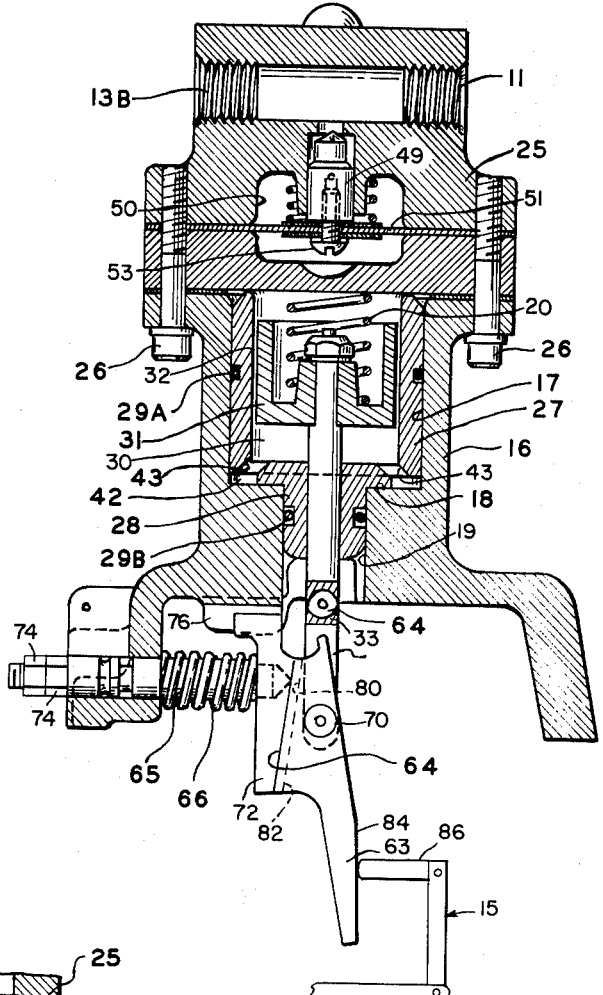
FIG. 3 is a cross sectional view of preferred embodiment of the present invention.

As can best be seen in FIG. 3, the control device 10 preferably comprises a housing structure 16 provided with a substantially cylindrical axially extending through bore 17. The bore 17 is reduced in section as shown intermediate its ends to form a radially extending shoulder portion 18 and a reduced hollow portion 19. One end of the bore 17 is closed by an end cap member 25 secured to the housing structure 16 by bolts 26. A substantially cylindrical sleeve member 26 is positioned between the end cap member 25 and the shoulder portion 18 and is provided with a reduced diameter portion 28 extending into the hollow portion 19. O-ring seals 29A and 29B are provided to prevent fluid leakage past the housing 16 and the sleeve member 27.

The interior of the sleeve member 27 and the cap member 25 define a pressure chamber 30 in which is axially slidably carried a piston 31. As can best be seen in FIG. 3 the outer periphery of the piston 31 is slightly radially inwardly spaced from the inner periphery of the sleeve member 27 to form an annular and longitudinally extending orifice 32. The piston 31 is maintained in a concentric position by a rod 33 extending through the portion 28 and the sleeve member 27 and is biased away from the end cap 25 by a spring 20. The rod 33 and the portion 28 are preferably lapped to close fit so that the rod 30 will freely move axially and accurately concentric with respect to the portion 28 and yet no seal is necessary therebetween.

Figure 4:
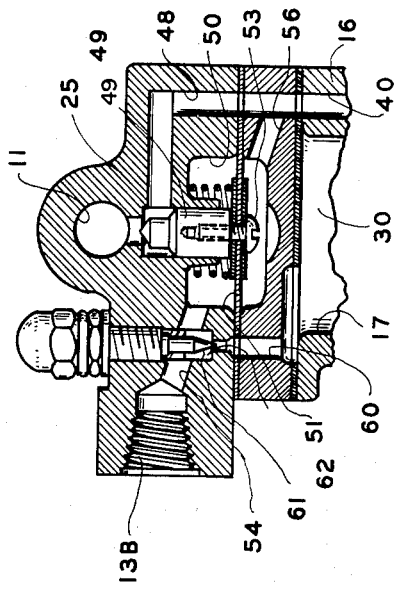
FIG. 4 is a fragmentary cross sectional view as seen substantially from the right of FIG. 3 with portions shown in elevation and other portions removed.
Figure 5:
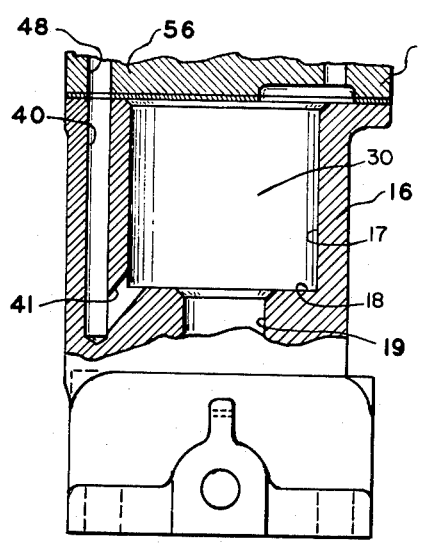
FIG. 5 is a fragmentary cross-sectional view as seen substantially from the left of FIG. 3 with portions shown in elevation and other portions removed for purposes of clarity.

As can best be seen in FIGS. 4–5, a vertically extending passage 40 is provided in the housing 16. A passage 41 provides communication between the passage 40 and an annular chamber 42 provided in the sleeve member 27. A plurality of annularly spaced ports 43 as shown in FIG. 3 provide communication between the chamber 42 and the pressure chamber 30.

The cap member 25 is provided with the inlet 11 adapted for connection with the pump B and an outlet passage 48 communicating with the passage 40. A valve member 49 is axially slidably carried in the cap member 25 and is operable to regulate fuel flow from the inlet 11 to the outlet passage 48. A control chamber 50 is provided in the end cap 25 and a diaphragm 51 is positioned in the control chamber 50. The diaphragm 51 is operably secured to the valve member 49 by a screw 53 so that differential pressures in the control chamber 50 as sensed by the diaphragm 51 produces a corresponding movement of the valve member 49. The outlet 13B communicates directly with the inlet 11.

The outlet 13B is provided in the cap member 25 and is adapted for connection to the fuel tank C. As can be seen in FIG. 4, a passage 54 provides a communication between the outlet 13B and the control chamber 50 so that one side of the diaphragm 51 is exposed to the atmospheric pressure of the fuel tank C plus the force produced by a spring member 55. A branch passage 56 provides communication between the outlet passage 48 and the control chamber 50 on the other side of the diaphragm 51.

A passage 60 is provided in the end cap member 25 and the housing 16 and connects the pressure chamber 30 downstream of the orifice 32 with the outlet 13B. An adjustable needle valve 61 is disposed in the passage 60 as shown in FIG. 4 to adjustably variably restrict fuel flow therethrough and to provide an adjustable orifice 62 downstream of the orifice 32.

As can best be seen in FIG. 3, a lever arm 63 is pivotally connected as at 64 to a forked member 68. The forked member 68 is in turn pivotally connected to the rod 33 as at 70. A wedge block 72 is secured to a pin member 65 which is in turn axially adjustably carried in an extension of the housing 16 by nuts 74 and a spring 66. A guide surface 76 on the housing structure 26 and an extension 78 of the wedge block 72 slidably engages the guide surface 76. It is apparent that tightening the nuts 74 will move the pin member 65 axially to the left as seen in FIG. 3 so that the wedge block 72 may be adjusted to the right or left as desired.

The lever arm 63 is provided with a grooved inclined face portion 80 which is complementary to and slidably receives an inclined face 82 provided on the wedge block 72. An opposite edge 84 of the lever arm 63 engages the linkage 15 so that as the rod 33 is moved axially a corresponding horizontal movement is produced in the first link 86 of the linkage 15. The linkage 15 is operably connected to the fuel pump B to vary the load stop (not shown) thereof.

In operation fuel is delivered by the fuel pump B to the inlet 11. The valve member 49 is actuated by the diaphragm 51 to regulate the pressure of the fuel entering the passage 40 to a substantially constant pressure. The upper surface of the diaphragm 51 as seen in FIG. 3 is subjected to a substantially constant pressure i.e. atmospheric plus the force of the spring 55 while the lower surface is subjected to a pressure dependent upon the pressure produced by the fuel pump B. If the pressure of the fuel entering the inlet 11 is more than the desired value, the valve 49 will open until the increased pressure acting upon the diaphragm 51 will cause the valve 49 to close to reduce the pressure in passage 48 to the desired value. It is apparent that in this way the fuel can be delivered to the passage 40 at a substantially constant pressure. It should be noted that various pressure regulating mechanisms may be sufficient for the purposes of the present invention, and the invention is not intended to be limited to the particular valve structure described. The pressure regulating means could if desired be located at a point remote from the rest of the control mechanism. All that is necessary is that the fuel be reduced to a substantially constant pressure before entering the chamber 30 so that only changes of pressure produced by changes in the viscosity of the fuel will be sensed and not changes in pressure produced by other variables.

The fuel flows through the passages 40, 41 through the chamber 42 and the ports 43 into the pressure chamber 30. Thus it is apparent that downward axial movement, as seen in FIG. 3, of the piston 31 is resisted by a substantially constant pressure. The fuel then passes through the first orifice 32 and then through the second orifice 62 formed by the needle valve 61 and from there out the outlet 13B to be returned to the fuel tank C. The orifices 32–62 have widely different flow characteristics and therefore have flow coefficients which change with viscosity changes of the fuel so that pressure in chamber 30 above the piston 31 will vary with changes in the viscosity of the fuel. The axial position of the piston 31 is therefore varied in accordance with this pressure change as produced by viscosity changes. Movements of the piston 31 are transmitted through the rod 33, the wedge block 72, and the lever arm 63 to the linkage 15. The linkage 15 varies the fuel load stop in the pump B. The amount of compensation required to maintain constant power output over a range of fuels is easily obtained by a proper selection of the wedge angle formed on the face portions 80 and 82 of the lever arm 63 and wedge block 72 respectively.

As is apparent from the chart shown in FIG. 1, fuel temperature affects fuel viscosity and without the inclusion of some compensating means for this effect the tendency of the control system described above would be to increase the amount of fuel injected beyond the desired limits at higher than normal ambient temperatures and decrease the amount injected below the desired limits at lower than normal temperatures. To compensate for these undesirable fuel temperature effects, a combination of materials is preferably selected for the sleeve member 27 and the piston 31 that will provide a variance in the orifice 32 is response to changes in the ambient temperatures of the fuel being used and in proportions commensurate with the attendant fuel quantity demands. For instance the combination of a relatively high expansion material for the piston 31 and a relatively low expansion material for the sleeve member 27 would reduce the orifice 32 with increased temperatures and enlarge it at lower temperatures. A reduction in the size of the orifice 32 would reduce the pressure acting on the upper portion of the piston 31 and thus fuel flow to the engine would be reduced. A combination of materials can be selected which will produce an enlargement of the orifice at higher temperatures if this is desirable when the sensing device is used for purposes other than the control of fuel injection.

It is apparent that although it has been preferred to describe the viscosity sensing means of the present invention as part of a fuel control system for multifuel engines, other uses could be readily made of the present invention. For instance, the device could be used as either a viscosity or heating value meter or sensor. Various other changes and modifications may be made without departing from the spirit of the invention or the scope of the appended claims:

We claim:

1. In a multifuel engine having a fuel supply means, a fuel control system for regulating the volume of fuel to the engine in response to changes in the viscosity of the fuel, said system comprising
    (a) means adapted for connection to said fuel supply means and operable to regulate the fuel to a predeterminded constant pressure, and
    (b) a viscosity responsive control device communicating with said pressure regulating means and operably connected with said fuel supply means to vary the fuel delivered to the engine by said supply means, said device comprising
        a housing having a first orifice and a second orifice connected in series and having different flow characteristics,
        said first orifice communicating with said pressure regulating means,
        said housing being further provided with a pressure chamber intermediate said first and second orifices,
        a piston slidably carried in said pressure chamber and means operably connecting said piston to said fuel supply means.

2. The system as defined in claim 1 and in which the wall of said pressure chamber and the outer peripheral surface of said piston form said first orifice.

3. The system as defined in claim 2 and including temperature responsive means being provided in said housing and operable to vary the size of at least one of said orifices in response to temperature variations in the fuel being delivered to the engine whereby the amount of fuel being delivered to the engine will be varied in response to changes in the temperature of fuel being delivered.

4. The fuel control system as defined in claim 3 and including means for manually adjusting the size of the other of said orifices.

5. The system as defined in claim 1 and in which
   (a) the wall defining said pressure chamber and the outer peripheral surface of said piston are spaced to form said first orifice, and
   (b) said wall and said piston having different coefficients of expansion whereby the size of said first orifice will vary in response to changes in the temperature of the fuel delivered by said fuel source.

6. The system as defined in claim 1 and in which said pressure regulating means comprises
   (a) a housing having an inlet communicating with said fuel supply means and an outlet communicating with said first orifice,
   (b) a passage being provided in said housing intermediate said outlet and said inlet,
   (c) a valve disposed in said passage and being operable to vary fuel flow from said inlet to said outlet,
   (d) a diaphragm operably connected to said valve,
   (e) said diaphragm being operable to open and close said valve to maintain a substantially constant pressure at said outlet.

No references cited.

RICHARD B. WILKINSON, *Primary Examiner.*